(12) United States Patent
Jessick et al.

(10) Patent No.: US 7,497,946 B2
(45) Date of Patent: Mar. 3, 2009

(54) SUBSURFACE DRIP DISPOSAL SYSTEM

(75) Inventors: Scott Jessick, Coeur d'Alene, ID (US); Ray Koberstine, Nine Mile Falls, WA (US); Allen Worst, Post Falls, ID (US)

(73) Assignee: R.C. Worst & Company, Inc., Coeur d'Alene, ID (US)

( * ) Notice: Subject to any disclaimer, the term of this patent is extended or adjusted under 35 U.S.C. 154(b) by 0 days.

(21) Appl. No.: 11/694,822

(22) Filed: Mar. 30, 2007

(65) Prior Publication Data

US 2008/0237106 A1 Oct. 2, 2008

(51) Int. Cl.
*E03F 1/00* (2006.01)
(52) U.S. Cl. .............. 210/170.08; 210/195.1; 210/433.1; 210/532.2; 210/747; 405/43; 405/51
(58) Field of Classification Search ........... 210/170.08, 210/194, 195.1, 258, 259, 433.1, 532.2, 747; 405/36, 43, 51
See application file for complete search history.

(56) References Cited

U.S. PATENT DOCUMENTS

| 5,133,622 | A | * | 7/1992 | Hewlett ................... 405/51 |
| 5,200,065 | A | * | 4/1993 | Sinclair et al. ........... 210/532.2 |
| 5,441,631 | A | * | 8/1995 | Stegall et al. ............. 210/258 |
| 5,597,477 | A | * | 1/1997 | Harry, III ................ 210/170.08 |
| 5,766,475 | A | * | 6/1998 | Mayer et al. ............. 210/195.1 |
| 5,984,574 | A | * | 11/1999 | Sinclair ................... 405/43 |
| 5,988,943 | A | * | 11/1999 | McCord .................. 405/43 |
| 6,309,539 | B1 | * | 10/2001 | Mayer .................... 210/170.08 |
| 6,773,606 | B2 | * | 8/2004 | Wilkins et al. ............. 210/747 |
| 2002/0070163 | A1 | * | 6/2002 | Lambert .................. 210/170 |
| 2003/0141229 | A1 | * | 7/2003 | Chaffee ................... 210/532.2 |

OTHER PUBLICATIONS

Wallace, S. D., "Design & Performance of Drip Dispersal Systems in Freezing Environments," Proceedings of the National Onsite Wastewater Recycling Association (NOWRA) Annual Conference, Laurel, Maryland, 2001, <http://www.geoflow.com/w_pdfs/NAWE%20Freezing%20paper.pdf>, 15 pages.

* cited by examiner

*Primary Examiner*—Christopher Upton
(74) *Attorney, Agent, or Firm*—Christensen O'Connor Johnson Kindness PLLC

(57) ABSTRACT

A subsurface drip wastewater disposal system and method are disclosed that eliminate the need for headworks, reduce the risk of damage to the system, and permit optimal pump sizing by simultaneously dosing, flushing the pipe network and flushing the filter. A tank and pump package provide effluent under pressure to the field piping network comprising a supply manifold, a return manifold, and a plurality of emitter lines. A discharge filter that is capable of simultaneous filtering and flushing is provided on the discharge line, and a first flow restrictor is provided on the filter flush return line. Effluent is discharged at a rate and pressure that permits simultaneous pipe flushing and dosing, with the return manifold returning to the tank through a field return line having a second flow restrictor. The size of the first and second flow restrictors is selected to provide the desired flow splits.

18 Claims, 5 Drawing Sheets

SUBSURFACE DRIP DISPOSAL SYSTEM

BACKGROUND

Subsurface drip disposal ("SDD") systems are systems for disposing of wastewater such as septic tank effluent and the like. Subsurface drip disposal provides a shallow, slow rate, pressure-dosed system used for land application of pretreated wastewater. In general, SDD systems are characterized by: (1) uniform distribution of effluent, (2) dosing and resting cycles, and (3) very shallow placement of trenches. SDD systems typically use small diameter piping with subsurface drip emitters. The effluent must be adequately filtered before distribution through the underground emitter system, and filters and the piping network must be routinely flushed or otherwise cleared of trapped particles.

Well-designed SDD systems distribute effluent uniformly at a relatively low application rate over an absorption field, also called the drip field. Waste fluids are applied at a controlled rate in the plant root zone, which tends to minimize percolation of the effluent. Hydraulic loading rates may vary, for example between 0.1 and 1.6 gallons per day per square foot.

Conventional SDD systems include valving and control systems referred to as headworks that direct and control the flow of the effluent. In a conventional SDD system the headworks include two or three solenoid valves that control the timing and sequence of fluid flows. A conventional SDD system may include a tank wherein the effluent is accumulated for dispersal, a pump for removing effluent from the tank, a supply manifold and return manifold, and a number of emitter lines that extend between the supply and return manifolds and are disposed in the drip field. The emitter lines include a number of small emitters distributed along their length through which the effluent is dispersed in the drip field.

In a typical conventional SDD system the pump is periodically engaged, and a first solenoid valve is opened, to send flow to the drip field for dispersal through the drip emitters. A valve on the return manifold is typically closed such that the pumped fluid flows uniformly away from the tank, and is dispersed through the emitters. This is typically referred to as "dosing" cycle, and may occur, for example, twelve times a day, for periods of 5-10 minutes. It will be appreciated that this frequency and duration for the dosing cycle is by way of example, and the actual timing selected will depend on the particular application.

In order to avoid accumulation of matter in the emitter lines and manifolds, cooperatively referred to herein as the "field piping network", a conventional SDD system will periodically engage a field piping network flushing cycle wherein relatively high-velocity effluent is pumped through the field piping network to clean out the pipes, with the valve for the return manifold open such that the effluent is partially returned to the tank. The minimum required fluid velocity for the flushing operation is often specified by local and/or state regulations. The field piping network flushing cycle may be engaged, for example, every 12-48 hours, and typically pressurizes the entire system such that effluent is also dispersed to the drip field, although the amount of such dosing is typically difficult to determine and/or unknown.

A conventional SDD system also includes a filter that prevents or reduces the amount of solid matter that is pumped from the SDD tank to the emitter lines, in order to prevent clogging of the emitters. Conventional SDD systems periodically engage a filter flush cycle wherein a third valve is opened to allow flow to go through a filter flushing port and return to the tank. In the filter flushing cycle fluids at a relatively high velocity are provided to remove matter from the filter. Typically the pump pressurizes the entire system, resulting in effluent also being dispersed through the emitters, although again the amount of fluid discharged may be difficult to determine or predict. In an exemplary septic tank application, a filter flush cycle may be engaged once for every 5-20 dose cycles.

SDD systems, particularly in cold weather climates, are designed and installed to drain back from the field piping (e.g., the emitters and plenums) into the dose tank after each dose, so that effluent does not freeze in the lines, potentially damaging the system. However, the headworks active valving systems used in most conventional SDD systems tend to interfere with proper drainage from the field piping, which can result in damage to the field piping network Moreover, the valving systems add significant costs and complexity to the drip disposal system. In addition, conventional SDD systems require three different pumping operations. There is one pressure and flow requirement for dosing the field, a different pressure and flow requirement for flushing the field piping network, and a third flow and pressure requirement for flushing the discharge filter. The differences in these three operating conditions make it difficult to select a suitable pump, and requires operation of the selected pump at non-optimal conditions at least some of the time.

To avoid the disadvantages associated with conventional SDD systems having headworks, a system without full headworks has been proposed in *Design & Performance of Drip Dispersal Systems in Freezing Environments* (published online at http://www.geoflow.com/research_w.html), by S. Wallace. However, the systems described therein include a solenoid valve for drain back of the effluent, and a throttle valve on the return head. Moreover, the disclosed system does not appear to include a filter, or means for flushing a filter.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A subsurface drip effluent disposal system is disclosed having a wastewater tank, such as a septic effluent tank, and a subsurface field piping network for dispersing flow from the tank. A pump is provided in the tank that pumps fluids through a discharge line to a discharge filter that is capable of simultaneous flushing and filtering. A spin filter is a suitable type of discharge filter. A portion of the flow received by the discharge filter is used to flush the filter and returns to the tank, and another portion of the flow is discharged to the field piping network. The field piping network includes a supply manifold that is fluidly connected to one end of a plurality of emitter lines having spaced apart emitters for discharging a portion of the flow. The opposite end of the emitter lines are connected to a return manifold that returns a portion of the flow to the tank. Flow restrictors are provided, preferably on the filter flush return line, and on the field return line, such that the flow split between the filter, the filter flush return, the drip dose, and the field return can be predetermined. The present system simultaneously flushes the discharge filter, doses the field, and flushes the field piping network, and does not require the use of active headworks, such as a solenoid operated valve systems.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
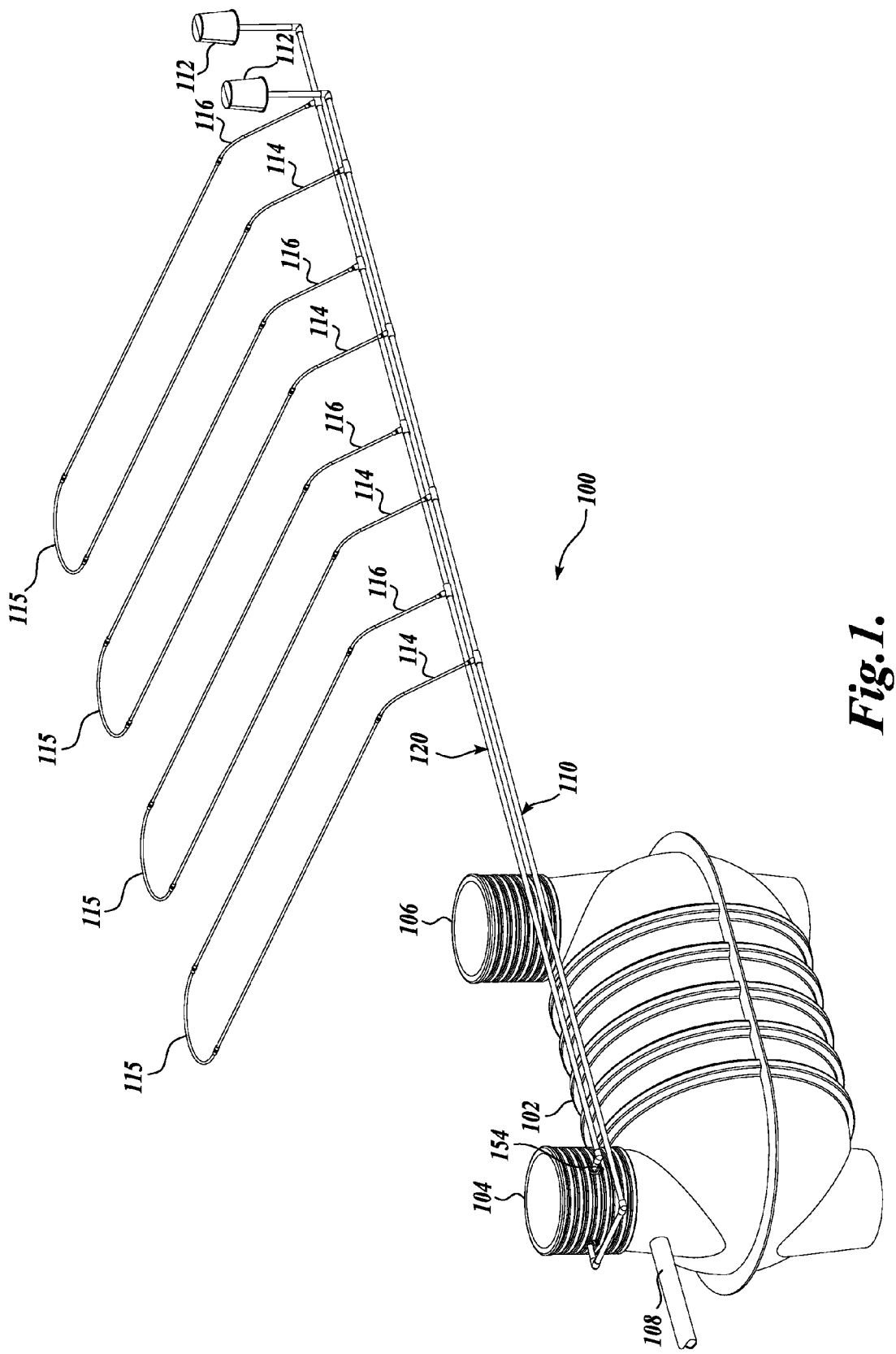
FIG. 1 is a perspective view of an exemplary subsurface drip effluent disposal system in accordance with the present invention, shown in isolation for clarity.

A perspective view of an exemplary subsurface drip effluent disposal system 100 in accordance with the present invention is shown in FIG. 1. The disposal system 100 includes a wastewater tank 102, for example a septic system effluent tank, which are well-known in the art. For example, the wastewater tank 102 may be an injection-molded fiberglass-reinforced polyester septic tank. The exemplary wastewater tank 102 shown in FIG. 1 includes oppositely-disposed first and second risers 104 and 106, respectively. Of course, other suitable tank construction may alternatively be used. A tank fluid inlet 108 provides a fluid conduit for supplying fluids to the wastewater tank 102. In a current embodiment of the drip effluent disposal system 100, for example, the inlet 108 is formed from four inch ABS piping. The inlet 108 may be fluidly coupled to a pretreatment tank or system (not shown), for example to substantially remove solids and/or harmful organisms, from the wastewater.

A supply manifold 110, extends from the wastewater tank 102, terminating in an air/vacuum relief valve 112. A plurality of generally U-shaped emitter lines 115 are provided having a first end 114 fluidly connected to the supply manifold 110, and a second end 116 fluidly connected to a return manifold 120. The emitter lines 115 include a number of spaced emitters (not shown), as are well-known in the art. For example, pressure-compensated emitters are adapted to produce a relatively constant outflow over a range of fluid pressures. Non-pressure-compensated emitters may alternatively be used. The inflow manifold 120 terminates at one end with a second air/vacuum relief valve 112, and at the other end returns to the tank 102 through a field return line 154. A portion of the effluent pumped through the emitter lines 115 is expelled through the emitters, thereby dosing the drip field. It will be appreciated by the artisan that in a typical alternative configuration the supply manifold 110 and return manifold 120 may be spaced a distance apart, with the emitter lines 115 extending therebetween.

In regions where freezing is a consideration, the emitter lines 115 are generally installed to slope towards the supply manifold 110 and/or the return manifold 120 such that when the system 100 is not pressurized, fluid in the emitter lines 115 will be gravity-driven towards one or both of the manifolds 110, 120. In these regions it is desirable that the emitter lines 115 not have any sag that would trap fluids therein. The supply manifold 110 and return manifold 120 are installed to slope towards the wastewater tank 102, such that when the system is not pressurized, fluid in the manifolds 110, 120 will flow under gravity towards the wastewater tank 102. In regions where freezing is not a consideration, the grading of the field piping is not a primary consideration.

Figure 2:
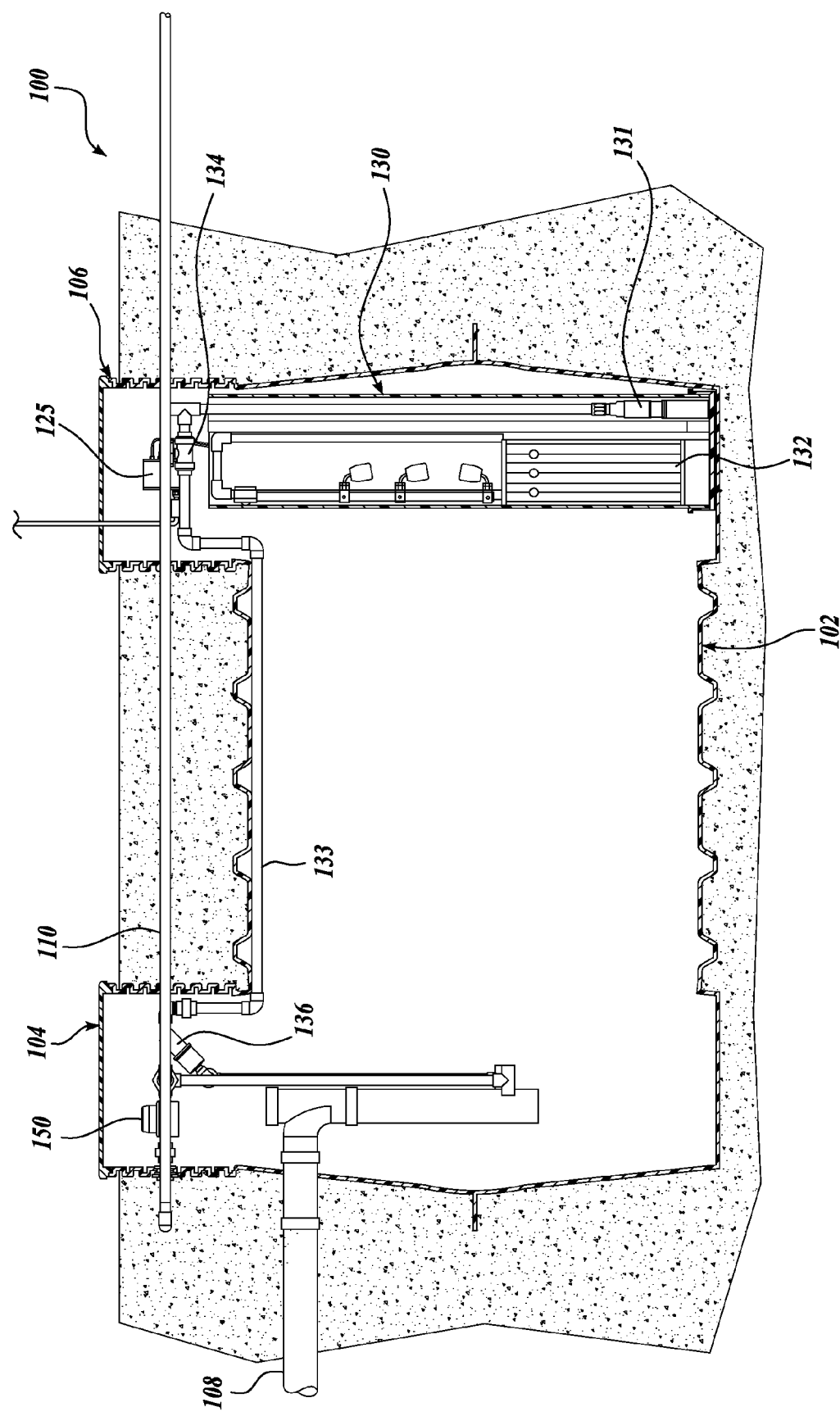
FIG. 2 is a partially side view of the wastewater tank shown in FIG. 1, shown installed with the tops of the risers at approximately ground level.

Refer now to FIG. 2, which shows an installed, partially cut-away side view of the wastewater tank 102. In the disclosed embodiment, a pump 131 is disposed in a pump package 130, which may include other related components such as waste filtering and/or treatment components 132 such as products marketed by Orenco Systems, Inc. under the trademark Biotube®. A pump discharge line 133 receives effluent from the pump 131, which is thereby delivered under pressure to the supply manifold 110 (FIG. 1). A manual shutoff valve 134 may be provided on the discharge line 133. A conventional junction box 125 is conveniently disposed in the second riser 106, for providing electrical power to the system 100.

Figure 3A:
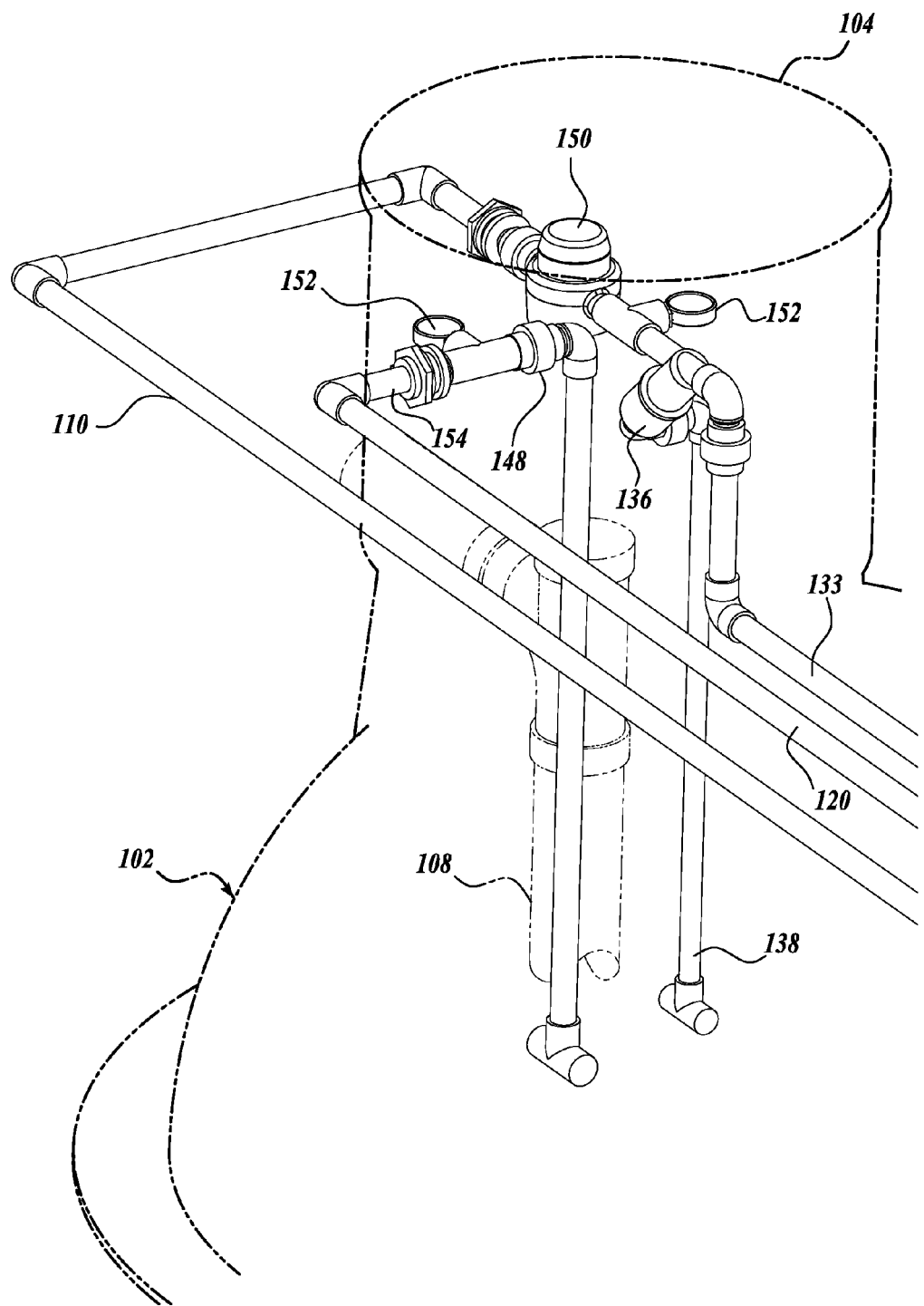
FIG. 3A is a three-quarter front perspective view of the piping in the first riser of the wastewater tank shown in FIG. 1.
Figure 3B:
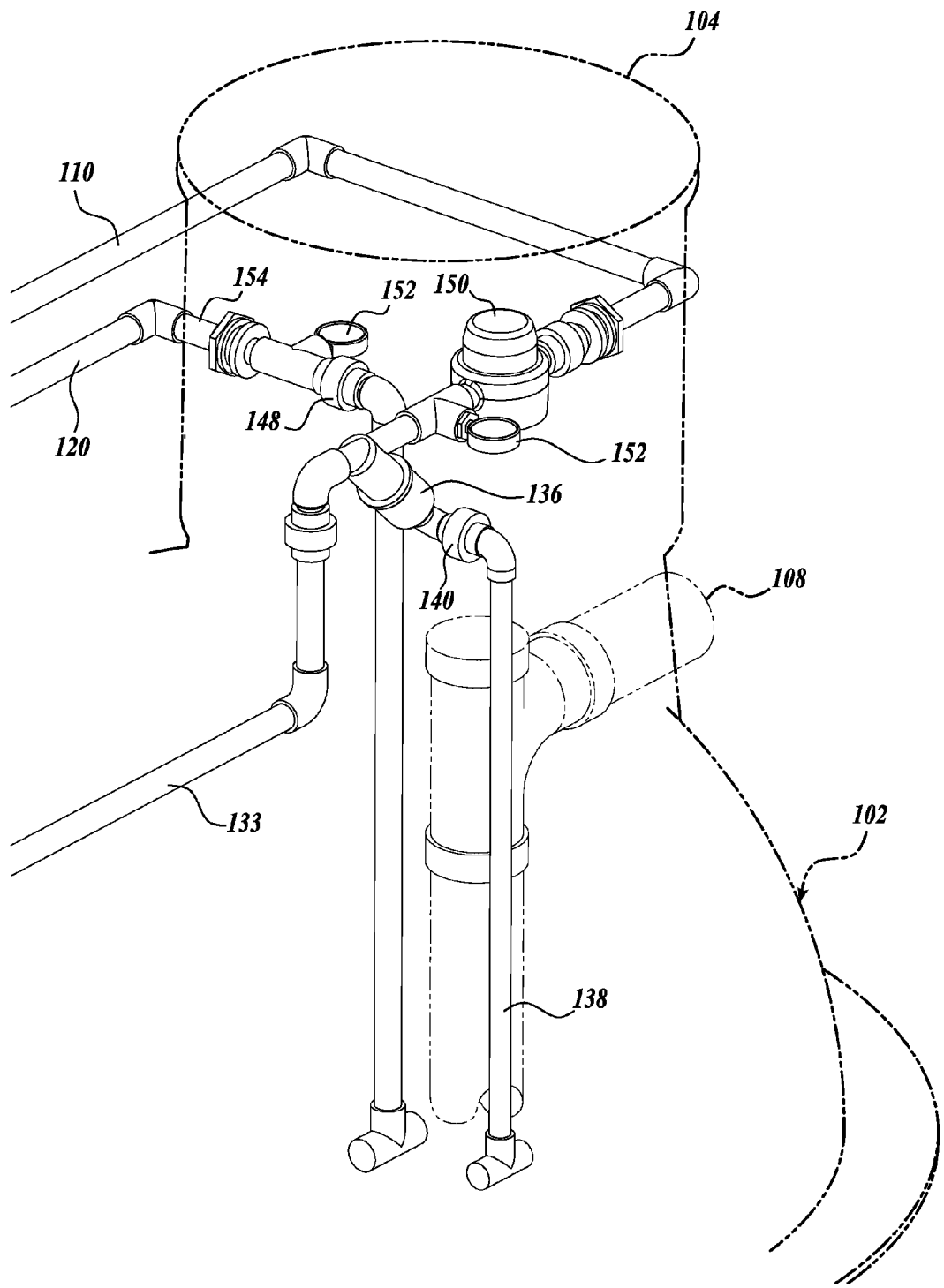
FIG. 3B is a three-quarter rear perspective view of the piping in the first riser of the wastewater tank shown in FIG. 1.
Figure 4:
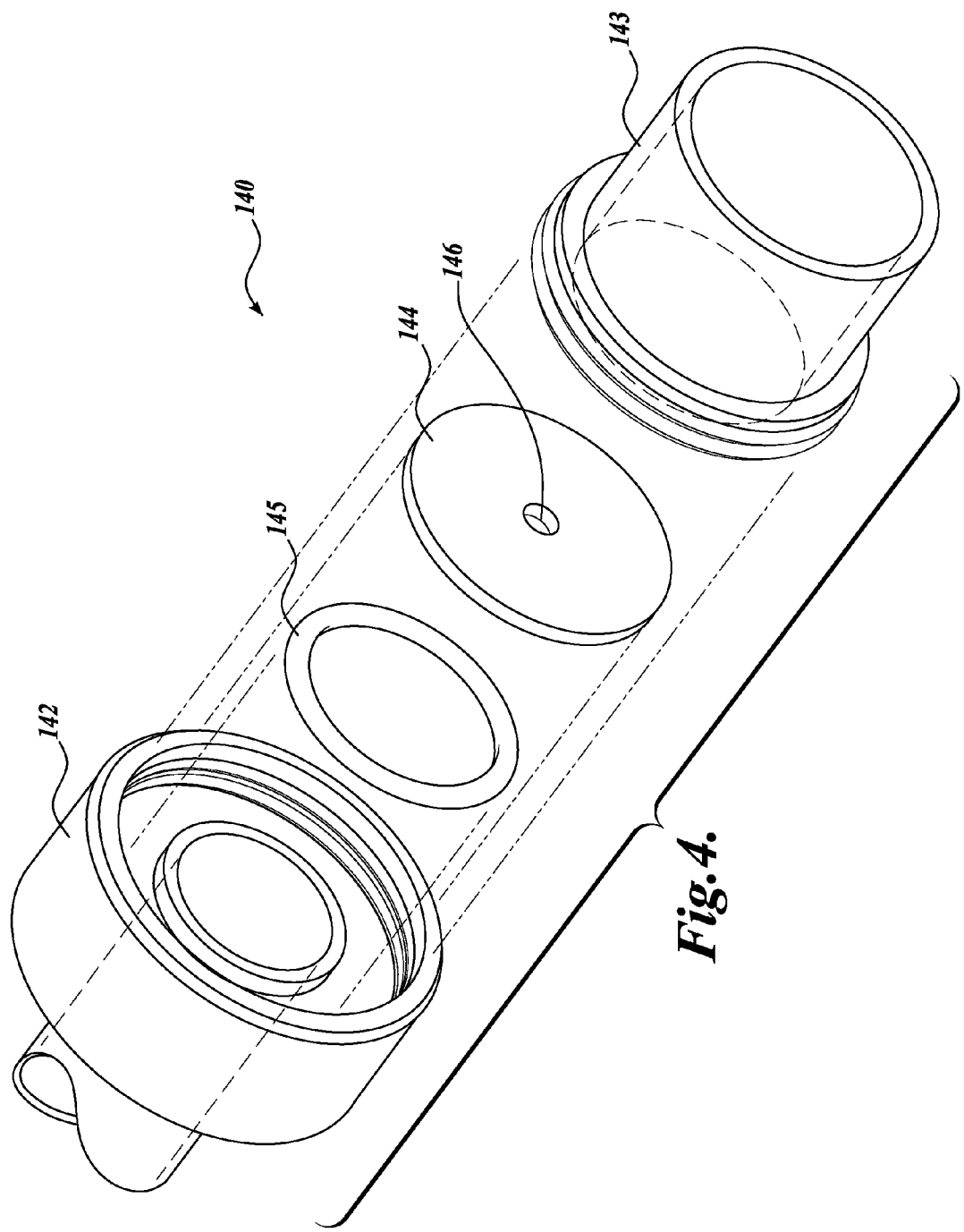
FIG. 4 is an exploded perspective view of an exemplary flow restrictor for the drip effluent disposal system shown in FIG. 1.

Refer now also to FIG. 3A and FIG. 3B which show the piping in the first riser 104 (the first riser 104 is shown in phantom, for clarity), from different perspectives to better show the piping. FIG. 3A shows a generally three-quarter front perspective view and FIG. 3B shows a generally three-quarter rear perspective view. The discharge line 133 is fluidly connected to a discharge filter 136 that is capable of simultaneously filtering effluent and flushing the filter 136, for example a spin filter. The discharge filter 136 removes solids from the effluent prior to its discharge into the supply manifold 110. The discharge filter 136 has one end attached to a filter flush return line 138 that returns effluent with filtered solids captured by the discharge filter 136 to the wastewater tank 102. A first flow restrictor 140 is disposed between the discharge filter 136, and the discharge filter flush return line 138. Suitable flow restrictors are known in the art. An exemplary flow restrictor 140 having a flow balance orifice 146 is shown in FIG. 4. In this embodiment, the first flow restrictor 140 includes a fitting 142 that supports a disk-shaped blocking member 144 with a calibrated aperture 146 therethrough, and a second fitting 143 that is attachable to the first fitting 142, as shown. An o-ring 145 provides a seal about the flow balance orifice 146. The function of the first flow restrictor 140 is discussed in more detail below.

An optional flow meter 150 and pressure gauge 152 are also provided on the discharge line 133, upstream of the supply manifold 110.

Referring again to FIG. 1, the effluent flow through the supply manifold 110 is distributed to the emitter lines 115, where a portion of the flow is dosed to the drip field. A portion of the effluent flow enters the return manifold 120, and is recirculated back to the wastewater tank 102. The return manifold 120 fluidly connects to a field return line 154 that extends into the wastewater tank 102. Referring now again to FIG. 3A and FIG. 3B, the field return line 154 includes a second flow restrictor 148 (discussed below) located prior to the return flow being discharged into the wastewater tank 102. The second flow restrictor 148 is similar in structure to the first flow restrictor 140 shown in FIG. 4. An optional pressure gauge 152 is also provided on the field return line 154.

The operation of the present subsurface drip effluent disposal system 100 will now be described. Generally at pre-scheduled intervals the pump 131 is activated and pumps fluids from the wastewater tank 102 through the discharge line 133. As the flow encounters the discharge filter 136, a portion of the flow flushes the discharge filter 136 and returns to the wastewater tank 102 through the filter flush return line 138, and a portion of the flow is discharged to the supply manifold 110. The supply manifold flow is then distributed to the emitter lines 115, wherein a portion of the effluent is dosed to the drip field, and a portion is returned to the return manifold 120, and thereby to the wastewater tank 102, with flow velocities throughout the field piping network that are sufficient to flush the pipes. For a given effluent disposal system 100, the flow splits between the filter flush portion, the field dose portion, and the piping flush portion are determined by the size of the apertures in the first and second flow restrictors 140, 148.

Frequently, subsurface drip effluent disposal systems must comply with local regulations, manufacturer recommendations and/or practical limitations regarding the amount of dosing that can be applied to a given drip field over a given period of time, piping network flushing flow velocity requirements, and filter flushing requirements.

With the present system, the dosing operation, piping network flushing and filter flushing can occur simultaneously. In particular, as disclosed herein the design of the SDD system can be accomplished using the following steps:

1. Specify the required wastewater discharge rate, for example in gal/day.
2. Identify the drip field soil type, and the allowable loading rate, for example in gal/ft^2/day.
3. Determine the emitter flow rate, the number of emitters required and the emitter lateral and in-line spacing requirements.
4. Calculate the required dimensions of the drip field.
5. Determine the piping flushing and filter flushing minimum flow requirements.
6. Determine the size of the supply manifold, emitter lines, and return manifold required to achieve the desired minimum flushing velocities.
7. Determine the optimal field piping network pressure, and pressure range for emitter lines.
8. Calculate the flow restrictor sizes required to achieve the desired flow splits to produce the desired minimum flow velocity in the field piping network, and to achieve the desired dosing and filter flushing flow rates.

It will be appreciated that the above method permits the calculation of the flow rate and head or piping pressures, which allows selection of the appropriate pump size. In order to optimize the system, a standard pump size may then be selected and the flow restrictor sizes re-optimized for the selected pump. Typically, the filter flushing flow rate may be increased to improve filter flushing without adversely impacting the pressure in the field piping network.

The SDD system 100 disclosed above provides significant advantages over the prior art. The active headworks with electronically-controlled valves is eliminated. Flow restrictors are provided that may be fixed aperture or pre-set upon installation. Although fixed aperture flow restrictors are shown and currently preferred, it is contemplated that the flow restrictors 140, 148 may alternatively be field-adjustable, such that the user may adjust the system, for example to optimize the flow rates during installation. The elimination of the headworks reduces cost and complexity, and increases the reliability of the system by promoting complete drain back to the tank between dosing cycles.

It will be appreciated that the present system and method provides for a uniform pumping cycle that simultaneously doses the drip field, flushes the discharge filter, and flushes the piping network. A properly designed system will achieve the requisite fluid velocities and flows required. This configuration reduces the number of times that the pump must be activated, and permits the designer to select an optimal pump size. In prior art systems wherein the flushing and dosing operations are separately conducted, the required flow rates are dramatically different, resulting in the pump operating outside of its optimal range for many cycles. The present system and method provides for a single dosing/flushing operation, and therefore one pump operating condition, allowing selection of a pump that will operate at or near its best efficiency point.

While illustrative embodiments have been illustrated and described, it will be appreciated that various changes can be made therein without departing from the spirit and scope of the invention.

The invention claimed is:

1. A subsurface drip wastewater disposal system comprising:
    a wastewater tank having an inlet for receiving wastewater;
    a pump adapted to pump wastewater from the tank;
    a discharge line attached to the pump to receive wastewater from the pump; and
    a discharge filter attached adapted to receive wastewater from the discharge line, wherein a first portion of the received wastewater flushes the filter and returns to the wastewater tank through a filter return line, and a second portion of the received wastewater is discharged to a supply manifold;
    a first flow restrictor attached to the filter return line;
    a plurality of emitter lines fluidly connected to receive flow from the supply manifold, each emitter line having at least one emitter, wherein a portion of the flow through each emitter line is discharged through the emitters;
    a return manifold fluidly connected to receive flow from the plurality of emitter lines; and
    a return line fluidly connecting the return manifold to the tank, wherein the return line includes a second flow restrictor, and further wherein the size of the first and second flow restrictors is fixed.

2. The system of claim 1, wherein the first and second flow restrictors each comprise blocking members having an aperture therethrough that is calibrated to control the flows through the system.

3. The system of claim 1, further comprising an air/vacuum relief valve disposed at the end of the supply manifold.

4. The system of claim 1, wherein the emitter lines are oriented at a slope to at least one of the supply manifold and the return manifold such that fluids in the emitter lines are gravitationally induced to flow towards at least one of the supply manifold and the return manifold.

5. The system of claim 4, wherein the supply manifold and the return manifold are oriented at a slope to the tank, such that fluids in the supply manifold and the return manifold are gravitationally induced to flow towards the tank.

6. The system of claim 1, wherein the discharge filter is a spin filter.

7. The system of claim 1, wherein the emitters comprise pressure compensating emitters.

8. The system of claim 1, wherein the tank comprises a first riser housing the discharge filter, and a second riser housing the pump.

9. The system of claim 1, further comprising a waste filtering and treatment component disposed in the tank.

10. The system of claim 1, wherein the size of the first and second flow restrictors are selected to achieve a desired minimum flow velocity in the supply manifold, emitter lines and return manifold.

11. The system of claim 1, wherein the system does not include any electronically operated valves.

12. The system of claim 1, wherein the discharge line further comprises a flow meter.

13. A method for sizing a subsurface drip disposal system having a first flow restrictor on a filter flush return line, and a second flow restrictor on a field return line, the method comprising the steps of:
- specifying the rate of wastewater to be discharged;
- identifying the drip field soil type;
- determining the emitter flow rate and the number of emitters required;
- determining the size of the field piping network components to achieve the desired piping minimum flushing velocity.
- determining the optimal field piping network pressure;
- calculating the flow restrictor sizes to optimize pressure in the field piping network, to achieve the desired dosing and flushing flow rates; and
- specifying flow restrictors having the calculated flow restrictor sizes, wherein the flow restrictor sizes are fixed.

14. The method of claim 13, further comprising the steps of:
- selecting a standard pump size that achieves at least the desired piping minimum flushing velocity;
- re-optimizing the flow restrictor sizes to accommodate the standard pump size, such that the desired piping minimum flushing velocity is retained while increasing the filter flushing flow rate.

15. A subsurface drip effluent disposal system for a septic system comprising:
- a tank having an inlet for receiving effluent;
- a pump adapted to pump effluent from the tank, through a discharge line;
- an inline spin filter attached to the discharge line, the spin filter having a filter flush return line;
- a field piping network fluidly coupled to the discharge line, the field piping network comprising a supply manifold that receives pumped effluent from the tank, a plurality of emitter lines that receive effluent from the supply manifold, a return manifold that receives effluent from the plurality of emitter lines, and a field return line that fluidly connects the return manifold to the tank;
- wherein a first portion of the pumped effluent flushes the spin filter and returns to the tank through the filter flush return line, a second portion of pumped effluent doses a drip field through the emitter lines and a third portion of the pumped effluent is returned to the tank through the field return line; and
- wherein the relative flows in the first, second and third portions of the pumped effluent are controlled by a first flow restrictor in the filter flush return line and a second flow restrictor in the field return line and further wherein the first and second flow restrictors comprise blocking members having an aperture therethrough that is a fixed size calibrated to control the flows through the system.

16. The system of claim 15, further comprising an air/vacuum relief valve disposed at the end of the supply manifold.

17. The system of claim 15, wherein the emitter lines are oriented at a slope to at least one of the supply manifold and the return manifold such that fluids in the emitter lines are gravitationally induced to flow towards at least one of the supply manifold and the return manifold.

18. The system of claim 17, wherein the supply manifold and the return manifold are oriented at a slope to the tank, such that fluids in the supply manifold and the return manifold are gravitationally induced to flow towards the tank.

* * * * *